3,009,968
PRODUCTION OF CHLOROPRENE

Frederick James Bellringer, Leatherhead, Clifford William Capp, Ewell, and Henry Peter Crocker, Hornsea, England, assignors to The Distillers Company Limited, Edinburgh, Scotland, a British company
No Drawing. Filed Aug. 4, 1959, Ser. No. 831,490
Claims priority, application Great Britain Aug. 28, 1958
4 Claims. (Cl. 260—655)

The present invention relates to the production of chloropene.

The production of chloropene by the dehydrochlorination of 3:4-dichlorobutene-1 is known. 3:4-dichlorbutene-1 may be produced by the chlorination of butadiene in the presence of n-butene and of butane, as described, for example in U.S. application Ser. No. 657,661, now U.S. Patent 2,948,760. In this process dichlorbutanes are formed from the butene and to a slight extent from the butane and these may be separated from the dichlorbutenes and pyrolysed to butadiene which is recycled to the chlorination stage. However, it is difficult to separate certain dischlorbutane isomers from dichlorbutenes, due to the similarity of their boiling points. Thus the boiling point of 2:3-dichlorbutane is 114–117° C. and the boiling point of 3:4-dichlorbutene-1 is 123° C. and their separation involves the use of a large and costly distillation column.

The aim of the present invention is to provide an improved process for the production of chloroprene in which the difficulties encountered in separating certain dichlorbutanes from dichlorbutenes are overcome.

According to the present invention the process for the production of chloroprene comprises chlorinating a mixture of butadiene with n-butene and/or butane to give a chlorination product containing 3:4-dichlorbutene-1 and dichlorbutanes, dehydrochlorinating the dichlorbutene in the presence of the dichlorbutanes, separating chloroprene from the dichlorbutanes, pyrolysing the dichlorbutanes to butadiene and introducing this butadiene to the chlorination stage.

The discovery on which the process of the present invention is based is that the dehydrochlorination of the 3:4-dichlorbutene-1 to chloroprene may be carried out in the presence of dichlorbutanes substantially without effect on the production of chloroprene or on the dichlorbutanes. As chloroprene and dichlorbutanes have dissimilar boiling points, it is then a simple matter to separate the chloroprene and dichlorbutanes by fractional distillation.

The mixture comprising 3:4-dichlorbutene-1 and dichlorbutanes is preferably produced according to the process described in U.S. Patent 2,948,760.

The chlorination of butadiene results in the formation of 1:4-dichlorbutene-2 in addition to 3:4-dichlorbutane-1 and it is preferable to isomerise the 1:4-dichlorbutene-2 to 3:4-dichlorbutene-1, before the dehydrochlorination stage, as only the 3:4-dichlorbutene-1 yields chloroprene on dehydrochlorination. The isomerisation may be carried out, for instance, as described in U.S.P. 2,446,475 by heating the dichlorbutenes to the boiling point in the presence of a copper catalyst such as cuprous chloride and distilling off the 3:4-dichlorbutene-1. It has been surprisingly discovered that dichlorbutanes may be present throughout the isomerisation of dichlorbutenes, substantially without effect on the dichlorbutanes or dichlorbutenes.

The dehydrochlorination of 3:4-dichlorbutene-1 to chloroprene may be carried out in any suitable manner, but it is preferred to dehydrochlorinate by heating the 3:4-dichlorbutene-1 with an aqueous alkali metal hydroxide solution and distilling off the chloroprene as it is formed. In a preferred embodiment of the present invention, the dehydrochlorination of the 3:4-dichlorbutene-1 is carried out in at least two stages, only part of the dichlorbutene being converted to chloroprene in the first stage.

After separation of the chloroprene from the dehydrochlorination reaction product by fractional distillation, the dichlorbutanes are recovered from the two-phase aqueous residue, suitably by distilling them out of the mixture as an overhead water azeotrope fraction, the wet distillate of dichlorbutanes preferably dried before being pyrolysed to butadiene.

The pyrolysis reaction is suitably carried out as described in Patent 2,948,760.

The followings examples are given further to illustrate the nature of the invention.

Example 1

A stock of crude 3:4-dichlorbutene-1 was made by co-chlorination of butene and butadiene followed by distillation and isomerisation as described above. It contained 11.4% by weight of 2:3-dichlorbutane and 3.9% of 1:2-dichlorbutane.

This material was dehydrochlorinated in a series of 41 batches in which approximately 3.6 lbs. of crude feed were run into a stirred reactor controlled at 85–87° C. containing 14.5 lbs. 10% sodium hydroxide solution. Chloroprene was evolved over a period of 30 minutes. The reactor temperature was then raised to strip out unreacted dichlorbutanes.

98.7% of the dichlorbutene was converted at an efficiency to chloroprene of 96.2% over this series of batches. The chloroprene fraction contained ca. 1% of 2-chlorbutene-2 and 2-chlorbutene-1 arising from the reaction of the dichlorbutanes. 76.3% of the dichlorbutanes were recovered in the oil layer from the stripping operation for recycle to the chlorination stage.

Example 2

A stock of crude 3:4-dichlorbutene-1 was made by co-chlorination of a feed containing butane, butene and butadiene, followed by distillation and isomerisation as described above. It contained 9.8% of 2:3 and 1:2-dichlorbutanes together with minor amounts of 1:3, 1:4 and 2:2-dichlorbutanes.

This material was fed together with about 25% molar excess of 10% sodium hydroxide solution to two stirred reactors in series controlled at 85–87°. Chloroprene was distilled out of each reactor and was collected as a combined fraction. 98.2% of the 3:4-dichlorbutene-1 fed was converted. The chloroprene made contained on average about 0.5% of 2-chlorbutene-2, 2-chlorbutene-1 and 1-chlorbutene-1 arising from reaction of the dichlorbutanes. The effluent from the second reactor was fed to a column into the kettle of which live steam was fed. An oil-water mixture was removed overhead, cooled and decanted, the water layer being returned as reflux. 60% of the dichlorbutanes fed into the reactors were recovered in the oil layer for recycle to the chlorination stage.

We claim:
1. The process for the production of chloroprene which comprises dehydrohalogenating with alkali 3:4-dichlorbutene-1 in the presence of dichlorbutanes and separating chloroprene by distillation for the dichlorbutanes.

2. The process as claimed in claim 5 wherein the dehydrochlorination is carried out by heating the 3:4-dichlorbutene-1 with an aqueous alkali metal hydroxide solution and distilling off the chloroprene as it is formed.

3. The process as claimed in claim 2 wherein the dehydrochlorination is carried out in at least two stages.

4. The process for the production of chloroprene which consists of dehydrochlorinating with alkali 3:4-dichlorbutene-1 in the presence of dichlorbutanes.

References Cited in the file of this patent

UNITED STATES PATENTS

| | | |
|---|---|---|
| 2,343,107 | Cass et al. | Feb. 29, 1944 |
| 2,430,016 | Hearne et al. | Nov. 4, 1947 |

UNITED STATES PATENT OFFICE
CERTIFICATE OF CORRECTION

Patent No. 3,009,968                                  November 21, 1961

Frederick James Bellringer et al.

It is hereby certified that error appears in the above numbered patent requiring correction and that the said Letters Patent should read as corrected below.

Column 2, line 19, for "followings" read -- following --; column 3, line 3, for "for" read -- from --; line 4, the claim reference numeral "5" read -- 1 --.

Signed and sealed this 17th day of April 1962.

(SEAL)
Attest:

ESTON G. JOHNSON

Attesting Officer

DAVID L. LADD

Commissioner of Patents